(12) United States Patent
Murdock

(10) Patent No.: US 10,145,268 B2
(45) Date of Patent: Dec. 4, 2018

(54) INJECTION MOLDED COMPOSITE FAN PLATFORM

(71) Applicant: UNITED TECHNOLOGIES CORPORATION, Farmington, CT (US)

(72) Inventor: James R. Murdock, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 463 days.

(21) Appl. No.: 14/400,929

(22) PCT Filed: Feb. 21, 2014

(86) PCT No.: PCT/US2014/017708
§ 371 (c)(1),
(2) Date: Nov. 13, 2014

(87) PCT Pub. No.: WO2014/149366
PCT Pub. Date: Sep. 25, 2014

(65) Prior Publication Data
US 2015/0132134 A1    May 14, 2015

Related U.S. Application Data

(60) Provisional application No. 61/930,184, filed on Jan. 22, 2014, provisional application No. 61/789,686, filed on Mar. 15, 2013.

(51) Int. Cl.
*F01D 25/28*    (2006.01)
*F01D 11/00*    (2006.01)
(Continued)

(52) U.S. Cl.
CPC .......... *F01D 25/28* (2013.01); *B29C 45/0005* (2013.01); *F01D 5/225* (2013.01);
(Continued)

(58) Field of Classification Search
CPC ....... F01D 25/28; F01D 11/008; F04D 29/322
See application file for complete search history.

(56) References Cited

U.S. PATENT DOCUMENTS 5,049,035 A * 9/1991 Marlin .................. F01D 11/008
416/193 A
5,161,949 A * 11/1992 Brioude .................... F01D 5/22
416/193 A
(Continued)

FOREIGN PATENT DOCUMENTS

EP      1046785 A2    10/2000
FR      2988427 A1     9/2013
WO   WO 2012153039 A1 * 11/2012 ............. B29C 70/48

OTHER PUBLICATIONS

English Machine Translation of FR 2988427 to Ravier, abstract and specification, translated Jul. 19, 2018.*
(Continued)

*Primary Examiner* — David E Sosnowski
*Assistant Examiner* — Wayne A Lambert
(74) *Attorney, Agent, or Firm* — Cantor Colburn LLP

(57) ABSTRACT

A fan platform for a gas turbine engine may include an outer flow path surface extending between a first side and a second side. An inner surface extends between the first side and the second side, and faces radially oppositely the outer flow path surface. A plurality of platform hooks may extend radially inwardly from the inner surface.

18 Claims, 3 Drawing Sheets

(51) Int. Cl.
  *F01D 5/22*   (2006.01)
  *F01D 5/28*   (2006.01)
  *B29C 45/00*  (2006.01)
  *B29K 77/00*      (2006.01)
  *B29K 79/00*      (2006.01)
  *B29K 105/12*     (2006.01)
  *B29L 31/08*      (2006.01)

(52) U.S. Cl.
  CPC ............ *F01D 5/282* (2013.01); *F01D 11/008* (2013.01); *B29K 2077/00* (2013.01); *B29K 2079/085* (2013.01); *B29K 2105/12* (2013.01); *B29L 2031/08* (2013.01); *F05D 2220/32* (2013.01); *F05D 2220/36* (2013.01); *F05D 2240/90* (2013.01); *F05D 2260/30* (2013.01); *F05D 2260/36* (2013.01); *F05D 2300/43* (2013.01); *F05D 2300/603* (2013.01)

(56) References Cited

U.S. PATENT DOCUMENTS

| | | | | |
|---|---|---|---|---|
| 5,277,548 A * | 1/1994 | Klein | ............. | F01D 11/008 29/889.21 |
| 5,466,125 A * | 11/1995 | Knott | ............. | F01D 11/008 416/193 A |
| 5,580,217 A * | 12/1996 | Richards | ............. | F01D 11/006 416/193 A |
| 6,217,283 B1 * | 4/2001 | Ravenhall | ............. | F01D 5/225 415/9 |
| 6,447,250 B1 | 9/2002 | Corrigan et al. | | |
| 7,553,125 B2 * | 6/2009 | Audic | ............. | G01M 1/34 415/118 |
| 7,950,900 B2 * | 5/2011 | Mulcaire | ............. | F01D 11/008 415/191 |
| 8,292,586 B2 * | 10/2012 | Bottome | ............. | F01D 11/008 416/191 |
| 8,814,521 B2 * | 8/2014 | Hoyland | ............. | F01D 11/008 416/193 R |
| 8,851,850 B2 * | 10/2014 | Hoyland | ............. | F01D 11/006 416/204 R |
| 2008/0226457 A1 | 9/2008 | Belmonte | | |
| 2009/0208335 A1 | 8/2009 | Bottome | | |
| 2009/0269202 A1 | 10/2009 | Borzakian et al. | | |
| 2011/0016697 A1 * | 1/2011 | Shula | ............. | F16B 31/028 29/525.02 |
| 2011/0146299 A1 * | 6/2011 | Hoyland | ............. | F01D 11/006 60/797 |
| 2011/0176921 A1 | 7/2011 | Gignoux et al. | | |
| 2014/0197567 A1 * | 7/2014 | Plante | ............. | B29C 70/48 264/219 |

OTHER PUBLICATIONS

International Search Report Application No. PCT/US2014/017708; dated Jun. 10, 2014.
Supplementary European Search Report and Communication; Application No. 14768813.9-1610/2971552; dated Nov. 15, 2016; 8 pages.

* cited by examiner

INJECTION MOLDED COMPOSITE FAN PLATFORM

CROSS-REFERENCE TO RELATED APPLICATIONS

This patent application is a U.S. National Stage under 35 U.S.C. § 371, claiming priority to International Application No. PCT/US14/17708 filed on Feb. 21, 2014, which claims priority under 35 USC § 119(e) to U.S. Provisional Patent Application Ser. No. 61/930,184 filed on Jan. 22, 2014 and U.S. Provisional Patent Application Ser. No. 61/789,686, filed on Mar. 15, 2013.

TECHNICAL FIELD

The subject matter of the present disclosure relates generally to gas turbine engines and, more particularly, relates to discrete fan platforms disposed between adjacent airfoils in gas turbine engines.

BACKGROUND

Fan platforms are commonly implemented in gas turbine engines to form an aerodynamic gas flow path in between adjacent fan blades. In some past designs, such as the case in some non-hollow fan blade designs, the fan platform is integrally formed to the fan blade. With integral fan platforms, the fan blade dovetails carry the centrifugal loads from both the fan blades and the fan platforms, which necessitates suitably large fan blade dovetails to compensate for these loads. This in turn, requires a suitably large rotor disk to accommodate the fan blade dovetails and the related centrifugal loads.

With the advent of more complex, hollow fan blades in some engine designs, the use of integral fan platforms was replaced with discrete fan platforms joined independently to the rotor disk between adjacent fan blades, allowing for a smaller fan blade dovetail, and in turn, a smaller rotor disk. In addition to weight reduction benefits of the hollow fan blades and a smaller rotor disk, the use of discrete fan platforms also makes it easier to replace any damaged platforms without having to remove the entire fan blade, as was the case with fan blades having integral fan platforms.

Most of these conventional discrete fan platforms are attached to the rotor disk via pins through devises and lugs located on the platforms and rotor disk, respectively. However, due to the nature of the pin attachment, the discrete fan platforms have a tendency to shift during engine operation, requiring additional features to compensate for the shifting. Moreover, many of these conventional discrete fan platforms have been fabricated from separate components of aluminum or composite lay-up, which tends to be an expensive process.

Accordingly, there is a need for a lightweight, easily manufactured discrete fan platform that is stably retained to the rotor disk, facilitates in reducing the time required for assembly and disassembly, and is less expensive to manufacture.

SUMMARY

In accordance with an aspect of the disclosure, a fan platform for a gas turbine engine is provided. The fan platform may include an outer flow path surface extending between a first side and a second side. An inner surface extends between the first side and the second side, and faces radially oppositely the outer flow path surface. A plurality of platform hooks may extend radially inwardly from the inner surface.

In accordance with another aspect of the disclosure, the fan platform is an injection molded composite fan platform.

In accordance with yet another aspect of the disclosure, the fan platform may further include a plurality of gussets extending radially inwardly from the inner surface. Each gusset of the plurality of gussets may be centrally located between the first side and the second side.

In accordance with still another aspect of the disclosure, the plurality of platform hooks may include a first and second upstream-facing platform hook and a downstream-facing platform hook.

In accordance with still yet another aspect of the disclosure, the plurality of gussets may include first through third gussets. The first gusset may be disposed between the first and second upstream-facing platform hooks. The second gusset may be disposed between the second upstream-facing platform hook and the downstream-facing platform hook. The third gusset may be disposed between the downstream-facing platform hook and a downstream end of the fan platform.

In further accordance with another aspect of the disclosure, the first side may be contoured to complementarily match a contour of a suction surface side of an airfoil and the second side may be contoured to complementarily match a contour of a pressure surface side of the airfoil.

In accordance with another aspect of the disclosure, a gas turbine engine is provided. The gas turbine engine includes a rotor disk. A plurality of airfoils extends radially outwardly from the rotor disk so that each airfoil of the plurality of airfoils is circumferentially spaced apart from one another. The gas turbine engine also includes a plurality of discrete fan platforms. Each discrete fan platform is disposed between adjacent airfoils. Each discrete fan platform may include an outer flow path surface that extends between a first side and a second side, an inner surface that extends between the first side and the second side so the inner surface faces radially oppositely the outer flow path surface, and a plurality of platform hooks that extends radially inwardly from the inner surface. The plurality of platform hooks is retained to the rotor disk.

In accordance with yet another aspect of the disclosure, the plurality of platform hooks are retained to a corresponding plurality of retention hooks disposed on the rotor disk.

In accordance with still another aspect of the disclosure, the plurality of platform hooks may include a first and second upstream-facing platform hook and a downstream-facing platform hook. The corresponding plurality of retention hooks may include first through third retention hooks. The first upstream-facing platform hook may be retained in the first retention hook. The second upstream-facing platform hook may be retained in the second retention hook. The downstream-facing platform hook may be retained in the third retention hook.

In accordance with still yet another aspect of the disclosure, the third retention hook may be formed of a support member and an inverted L-shaped flange. The support member radially outwardly extends from the rotor disk. The downstream-facing platform hook is retained between the support member and the L-shaped flange, and a bolt secures the L-shaped flange to the support member.

In further accordance with yet another aspect of the disclosure, the gas turbine engine may further include a plurality of gussets extending radially inwardly from the inner surface so that each gusset of the plurality of gussets may be centrally located between the first side and the second side.

In further accordance with still another aspect of the disclosure, the plurality of gussets may include first through third gussets. The first gusset may be disposed between the first and second upstream-facing platform hooks. The second gusset may be disposed between the second upstream-facing platform hook and the downstream-facing platform hook. The third gusset may be disposed between the downstream-facing platform hook and a downstream end of the fan platform.

In further accordance with still yet another aspect of the disclosure, each discrete fan platform of the plurality of discrete fan platforms may be an injection molded composite fan platform.

In further accordance with a further aspect of the disclosure, the first side may be contoured to complementarily match a contour of a suction surface side of its adjacent airfoil and the second side may be contoured to complementarily match a contour of a pressure surface side of its adjacent airfoil.

In accordance with another aspect of the disclosure, a method of constructing a discrete fan platform is provided. The method entails injection molding a composite material to form a fan platform that includes an outer flow path surface extending between a first side and a second side, an inner surface extending between the first side and the second side, the inner surface facing radially oppositely the outer flow path surface, and a plurality of platform hooks extending radially inwardly from the inner surface.

In accordance with yet another aspect of the disclosure, the fan platform may be formed so that the plurality of platform hooks further include a first and second upstream-facing platform hook and a downstream-facing platform hook.

In accordance with still another aspect of the disclosure, the fan platform may be formed so that a plurality of gussets extends radially inwardly from the inner surface. Each gusset of the plurality of gussets may be centrally located between the first side and the second side.

In accordance with still yet another aspect of the disclosure, the fan platform may be formed so that the plurality of gussets may include first through third gussets. The first gusset may be disposed between the first and second upstream-facing platform hooks. The second gusset may be disposed between the second upstream-facing platform hook and the downstream-facing platform hook. The third gusset may be disposed between the downstream-facing platform hook and a downstream end of the fan platform.

In accordance with an even further aspect of the disclosure, the fan platform may be formed so that the first side may be contoured to complementarily match a contour of a suction surface side of an airfoil and the second side may be contoured to complementarily match a contour of a pressure surface side of the airfoil.

In further accordance with another aspect of the disclosure, the composite material may be a chopped fiber reinforced engineering plastic.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only certain illustrative embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential", and their derivatives, are generally used with respect to the longitudinal central axis of the engine.

Figure 1:
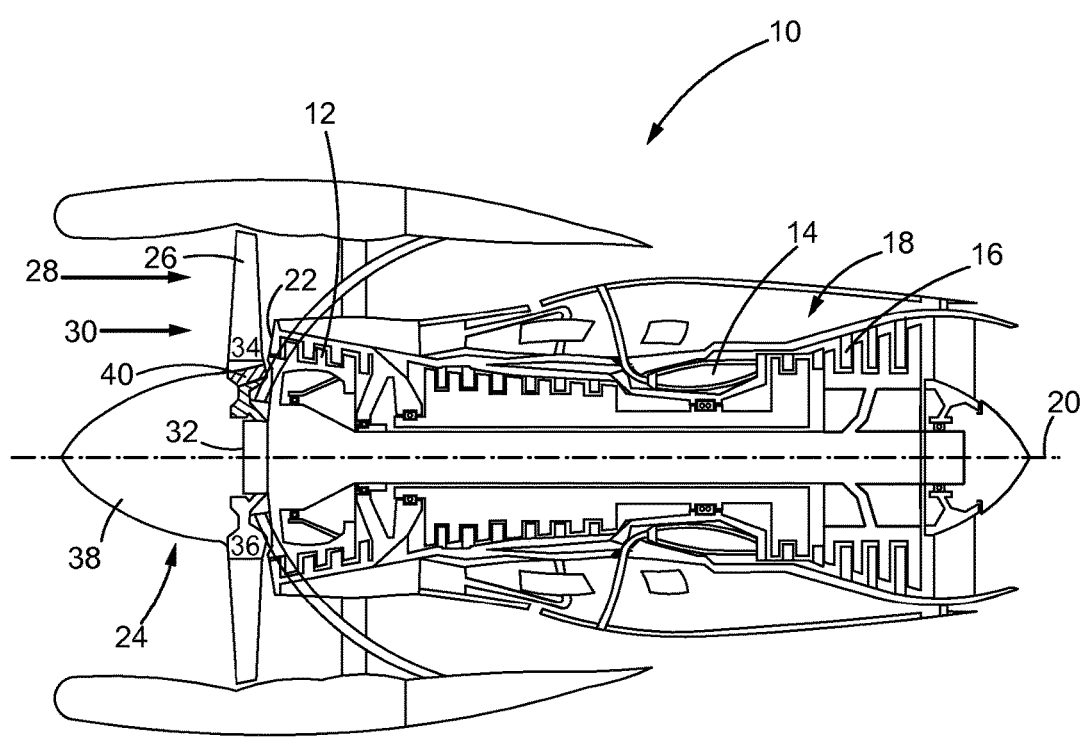
FIG. 1 is a side view of a gas turbine engine with portions sectioned and broken away to show details of the present disclosure.

Referring now to FIG. 1, a gas turbine engine constructed in accordance with the present disclosure is generally referred to by reference numeral 10. The gas turbine engine 10 includes a compressor 12, a combustor 14 and a turbine 16. The serial combination of the compressor 12, the combustor 14 and the turbine 16 is commonly referred to as a core engine 18. The engine 10 lies along a longitudinal central axis 20.

Air enters compressor 12 at the compressor inlet 22 and is pressurized. The pressurized air then enters the combustor 14. In the combustor 14, the air mixes with jet fuel and is burned, generating hot combustion gases that flow downstream to the turbine 16. The turbine 16 extracts energy from the hot combustion gases to drive the compressor 12 and a fan 24, which includes airfoils 26. As the turbine 16 drives the fan 24, the airfoils 26 rotate so as to take in more ambient air. This process accelerates the ambient air 28 to provide the majority of the useful thrust produced by the engine 10. Generally, in some modern gas turbine engines, the fan 24 has a much greater diameter than the core engine 18. Because of this, the ambient air flow 28 through the fan 24 can be 5-10 times higher, or more, than the combustion air flow 30 through the core engine 18. The ratio of flow through the fan 24 relative to flow through the core engine 18 is known as the bypass ratio.

The fan 24 includes a rotor disk 32 from which the airfoils 26 extend radially outwardly. The airfoils 26 are circumferentially spaced apart from one another around the rotor disk 32. Each of the airfoils 26 includes a pressure surface side 34 and an opposite-facing suction surface side 36. A conical spinner 38 is coupled to the upstream side of the rotor disk 32 and defines an aerodynamic flow path. The fan 24 also includes a plurality of discrete fan platforms 40 (only one shown in FIG. 1). Each discrete fan platform of the plurality of discrete fan platforms 40 is disposed between adjacent airfoils 26.

Figure 2:
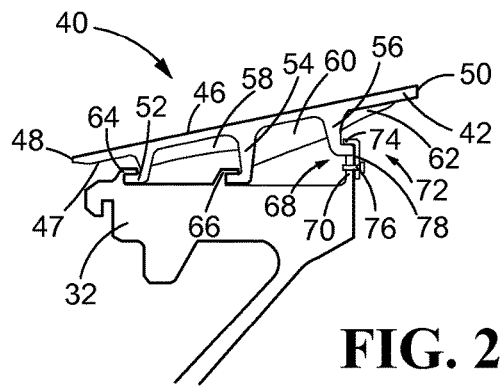
FIG. 2 is an enlarged side view of a discrete fan platform, constructed in accordance with the teachings of this disclosure.
Figure 3:
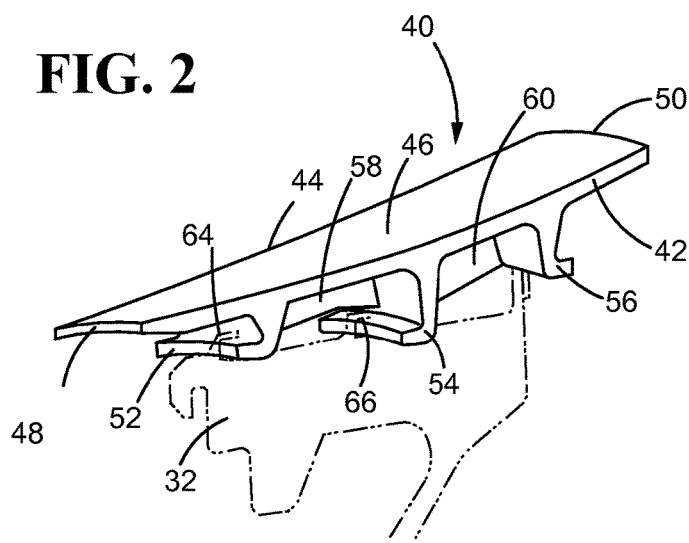
FIG. 3 is an enlarged perspective view of a discrete fan platform, constructed in accordance with this disclosure.
Figure 4:
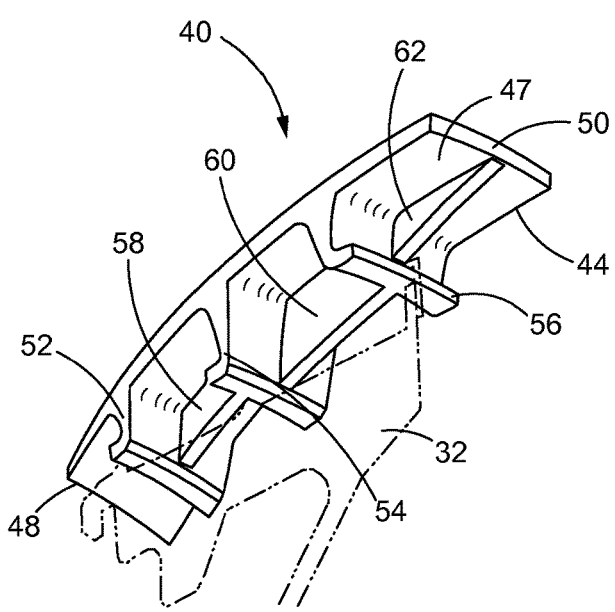
FIG. 4 is another enlarged perspective view of a discrete fan platform, constructed in accordance with this disclosure.

As best seen in FIGS. 2-4, a single discrete fan platform 40 is shown in greater detail. The discrete fan platform 40 includes a first side 42, a second side 44, and a radially outer flow path surface 46 extending between the first and second sides 42, 44. The discrete fan platform 40 also includes a radially inner surface 47 that also extends between the first and second sides 42, 44 and oppositely faces the outer flow path surface 46. The first side 42 may be contoured to complementarily match the contour of the suction surface side 36 of its adjacent airfoil 26. Similarly, the second side 44 may be contoured to complementarily match the contour of the pressure surface side 34 of its adjacent airfoil 26.

The discrete fan platform 40 also includes an upstream end 48 disposed adjacent to the spinner 38 and an axially opposite downstream end 50 disposed adjacent to the compressor inlet 22. A first and second upstream-facing platform hook 52, 54 and a downstream-facing platform hook 56 may extend substantially radially inwardly from the inner surface 47 such that the second upstream-facing platform hook 54 may be disposed between the first upstream-facing platform hook 52 and the downstream-facing platform hook 56. The first and second upstream-facing platform hooks 52, 54 may be orientated towards the upstream end 48 while the downstream-facing platform hook 56 may be orientated towards the downstream end 50.

First through third gussets 58, 60, 62 may also extend substantially radially inwardly from the inner surface 47 and may be centrally located between the first side 42 and the second side 44. The first gusset 58 may be disposed between the first and second upstream-facing platform hooks 52, 54. The second gusset 60 may be disposed between the second upstream-facing platform hook 54 and the downstream-facing platform hook 56. The third gusset 62 may be disposed between the downstream-facing platform hook 56 and the downstream end 50 of the fan platform 40. The gussets 58, 60, 62 are provided to ensure stiffness of the fan platform 40.

Furthermore, each discrete fan platform 40 is retained to the rotor disk 32. In particular, the first upstream-facing platform hook 52 is retained in a corresponding first downstream-facing retention hook 64 disposed on the rotor disk 32; the second upstream-facing platform hook 54 is retained in a corresponding second downstream-facing retention hook 66 disposed on the rotor disk 32; and the downstream-facing platform hook 56 is retained in a corresponding upstream-facing retention hook 68, which is formed of a support member 70 that extends radially outwardly from the rotor disk 32 and a discrete inverted L-shaped flange 72. In particular, the downstream-facing platform hook 56 is retained between the support member 70 and the axially extending portion 74 of the inverted L-shaped flange 72. Further, a bolt 76 secures the radially extending portion 78 of the inverted L-shaped flange 72 to the support member 70 ensuring that the downstream-facing platform hook 56 is securely retained in the upstream-facing retention hook 56. The upstream-facing retention hook 68 is implemented in this fashion to facilitate assembly and disassembly of the discrete fan platform 40 to the rotor disk 32.

Each discrete fan platform 40 is retained to the rotor disk 32, in a similar manner as described above, via its corresponding retention hooks disposed on the rotor disk 32.

Although each discrete fan platform 40 is described as being retained to the rotor disk 32 via its platform hooks 52, 54, 56 and corresponding retention hooks 64, 66, 68, respectively, any suitable number of platform hooks and corresponding retention hooks may be implemented to fit within the scope of the disclosure. Similarly, the number of gussets implemented is determined by the number of platform hooks and corresponding retention hooks.

Each discrete fan platform 40 may be manufactured as an injection molded composite piece. As non-limiting examples, each discrete fan platform 40 may be molded from a variety of chopped fiber reinforced engineering plastics such as graphite, glass fiber reinforced Torlon®, Ultem®, Zytel® or Rynite®.

The outer flow path surface 46 of each discrete fan platform 40 is contoured so that during operation it defines a continuous aerodynamic flow path from the spinner 38 to the compressor inlet 22, as the air flow 30 passes over the outer flow path surface 46 between adjacent airfoils 26.

Figure 5:
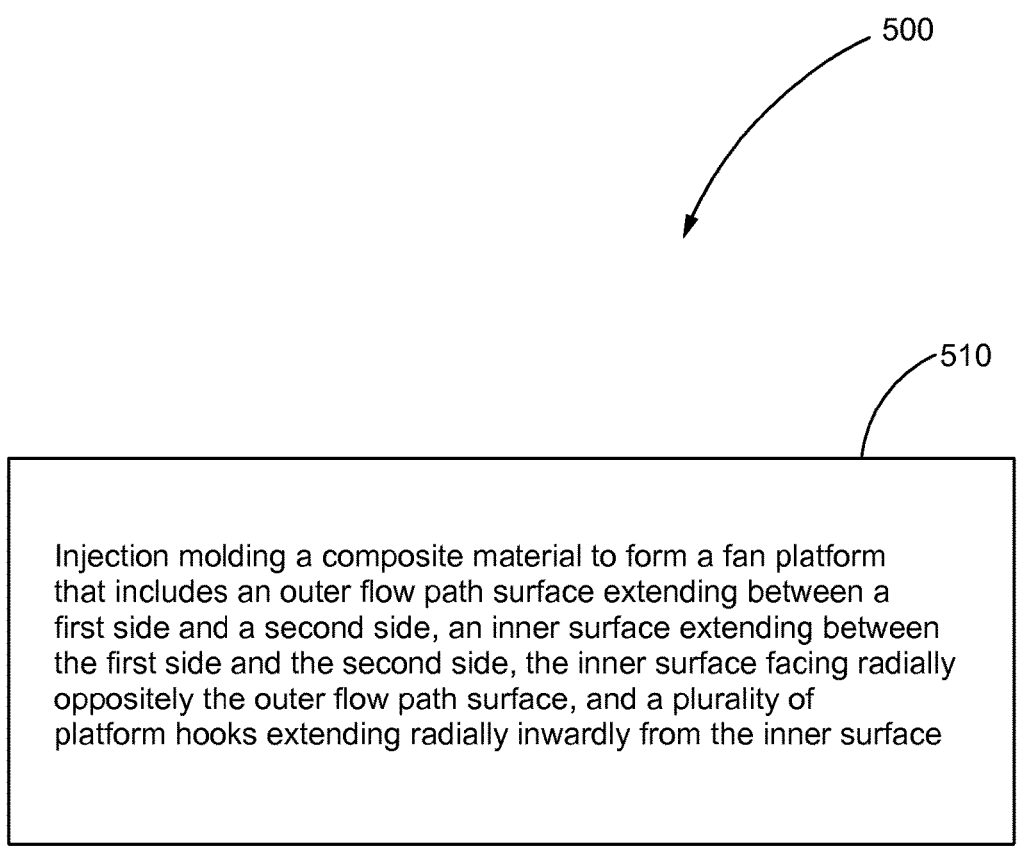
FIG. 5 is a flowchart illustrating a sample step which may be practiced in accordance with a method of the present disclosure.

FIG. 5 illustrates a flowchart 500 of a method of constructing a discrete fan platform. Box 510 shows the step of injection molding a composite material to form a fan platform that includes an outer flow path surface extending between a first side and a second side, an inner surface extending between the first side and the second side, the inner surface facing radially oppositely the outer flow path surface, and a plurality of platform hooks extending radially inwardly from the inner surface. The plurality of platform hooks may include a first and second upstream-facing platform hook and a downstream-facing platform hook. A plurality of gussets may extend radially inwardly from the inner surface so that each gusset of the plurality of gussets is centrally located between the first side and the second side. The plurality of gussets may include first through third gussets with the first gusset being disposed between the first and second upstream-facing platform hooks, the second gusset being disposed between the second upstream-facing platform hook and the downstream-facing platform hook, and the third gusset being disposed between the downstream-facing platform hook and a downstream end of the fan platform. Further, the first side may be contoured to complementarily match a contour of a suction surface side of an airfoil and the second side may be contoured to complementarily match a contour of a pressure surface side of the airfoil. The composite material may be a chopped fiber reinforced engineering plastic.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth a discrete fan platform, which may be formed by injection molding. The teachings of this disclosure can be employed to ensure discrete fan platform stability to the rotor disk during engine operation. Additionally, the disclosure also teaches a discrete fan platform that facilitates in reducing the time required for assembly and disassembly of discrete fan platforms from gas turbine engines. Furthermore, the injection molded composite fan platform reduces the overall weight of the gas turbine engine and significantly reduces the manufacturing costs.

What is claimed is:

1. A fan platform for a gas turbine engine, the fan platform comprising:
    an outer flow path surface extending between a first side and a second side, the outer flow path surface extending from an upstream end configured to be disposed adjacent to a spinner of the gas turbine engine to a downstream end configured to be disposed adjacent to a compressor inlet of the gas turbine engine;
    an inner surface extending between the first side and the second side, the inner surface facing radially oppositely the outer flow path surface; and
    a plurality of platform hooks extending radially inwardly from the inner surface, each platform hook including:
        a leg portion connected to the inner surface and extending radially inwardly therefrom; and
        a hook portion configured to engage a complimentary retention feature of a rotor disk;
    wherein the plurality of platform hooks includes a first and second upstream end-facing platform hook and a downstream end-facing platform hooks, the upstream end of the outer flow path surface located farther upstream than an upstream extent of each of the platform hooks of the plurality of platform hooks.

2. The fan platform of claim 1, wherein the fan platform is an injection molded composite fan platform.

3. The fan platform of claim 1, further including a plurality of gussets extending radially inwardly from the inner surface, each gusset of the plurality of gussets centrally located between the first side and the second side.

4. The fan platform of claim 3, wherein the plurality of gussets includes first through third gussets, the first gusset disposed between the first and second upstream end-facing platform hooks, the second gusset disposed between the second upstream end-facing platform hook and the downstream end-facing platform hook, the third gusset disposed between the downstream end-facing platform hook and a downstream end of the fan platform.

5. The fan platform of claim 1, wherein the first side is contoured to complementarily match a contour of a suction surface side of an airfoil and the second side is contoured to complementarily match a contour of a pressure surface side of the airfoil.

6. A gas turbine engine, the engine comprising:
    a rotor disk;
    a plurality of airfoils extending radially outwardly from the rotor disk, each airfoil of the plurality of airfoils being circumferentially spaced apart from one another; and
    a plurality of discrete fan platforms, each discrete fan platform of the plurality of discrete fan platforms being disposed between adjacent airfoils, each discrete fan platform including an outer flow path surface extending between a first side and a second side, the outer flow path surface extending from an upstream end configured to be disposed adjacent to a spinner of the gas turbine engine to a downstream end configured to be disposed adjacent to a compressor inlet of the gas turbine engine, an inner surface extending between the first side and the second side, the inner surface facing radially oppositely the outer flow path surface, and a plurality of platform hooks extending radially inwardly from the inner surface, the plurality of platform hooks being retained to the rotor disk, each platform hook including:
        a leg portion connected to the inner surface and extending radially inwardly therefrom; and
        a hook portion configured to engage a complimentary retention feature of the rotor disk;
    wherein the plurality of platform hooks includes a first and second upstream end-facing platform hook and a downstream end-facing platform hook, the upstream end of the outer flow path surface located farther upstream than an upstream extent of each of the platform hooks of the plurality of platform hooks.

7. The gas turbine engine of claim 6, wherein the plurality of platform hooks are retained to a corresponding plurality of retention hooks disposed on the rotor disk.

8. The gas turbine engine of claim 7, wherein the plurality of retention hooks includes first through third retention hooks, the first upstream end-facing platform hook is retained in the first retention hook, the second upstream end-facing platform hook is retained in the second retention hook, and the downstream end-facing platform hook is retained in the third retention hook.

9. The gas turbine engine of claim 8, wherein the third retention hook is formed of a support member and an inverted L-shaped flange, the support member radially outwardly extends from the rotor disk, the downstream end-facing platform hook is retained between the support member and the L-shaped flange, and a bolt secures the L-shaped flange to the support member.

10. The gas turbine engine of claim 8, further including a plurality of gussets extending radially inwardly from the inner surface, each gusset of the plurality of gussets centrally located between the first side and the second side.

11. The gas turbine engine of claim 10, wherein the plurality of gussets includes first through third gussets, the first gusset disposed between the first and second upstream end-facing platform hooks, the second gusset disposed between the second upstream end-facing platform hook and the downstream end-facing platform hook, the third gusset disposed between the downstream end-facing platform hook and a downstream end of the discrete fan platform.

12. The gas turbine engine of claim 6, wherein each discrete fan platform of the plurality of discrete fan platforms is an injection molded composite fan platform.

13. The gas turbine engine of claim 6, wherein the first side is contoured to complementarily match a contour of a suction surface side of its adjacent airfoil and the second side is contoured to complementarily match a contour of a pressure surface side of its adjacent airfoil.

14. A method of constructing a discrete fan platform, the method comprising:
    injection molding a composite material to form a fan platform that includes an outer flow path surface extending between a first side and a second side, the outer flow path surface extending from an upstream end configured to be disposed adjacent to a spinner of the gas turbine engine to a downstream end configured to be disposed adjacent to a compressor inlet of the gas turbine engine, an inner surface extending between the first side and the second side, the inner surface facing radially oppositely the outer flow path surface, and a plurality of platform hooks extending radially inwardly from the inner surface, each platform hook including:
        a leg portion connected to the inner surface and extending radially inwardly therefrom; and a hook portion configured to engage a complimentary retention feature of a rotor disk;

wherein the plurality of platform hooks includes a first and second upstream end-facing platform hook and a downstream end-facing platform hook, the upstream end of the outer flow path surface located farther upstream than an upstream extent of each of the platform hooks of the plurality of platform hooks.

15. The method of claim 14, wherein a plurality of gussets extend radially inwardly from the inner surface, each gusset of the plurality of gussets centrally located between the first side and the second side.

16. The method of claim 15, wherein the plurality of gussets includes first through third gussets, the first gusset disposed between the first and second upstream end-facing platform hooks, the second gusset disposed between the second upstream end-facing platform hook and the downstream end-facing platform hook, the third gusset disposed between the downstream end-facing platform hook and a downstream end of the fan platform.

17. The method of claim 14, wherein the first side is contoured to complementarily match a contour of a suction surface side of an airfoil and the second side is contoured to complementarily match a contour of a pressure surface side of the airfoil.

18. The method of claim 14, wherein the composite material is a chopped fiber reinforced engineering plastic.

* * * * *